Aug. 13, 1957   J. H. WALLACE   2,802,251
MANUALLY RELEASABLE FASTENING DEVICE FOR SAFETY BELTS AND THE LIKE
Filed June 16, 1953
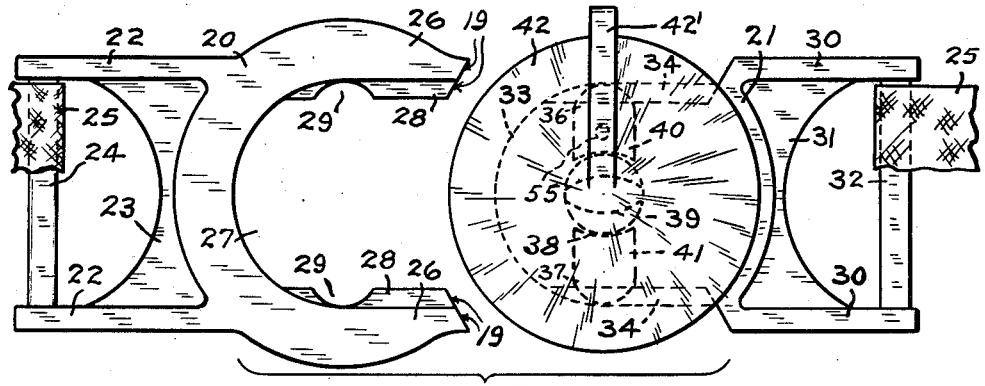
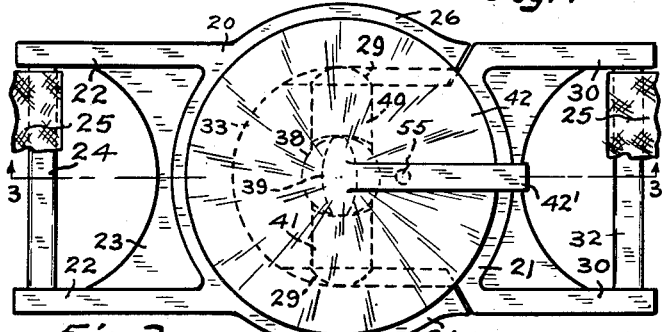
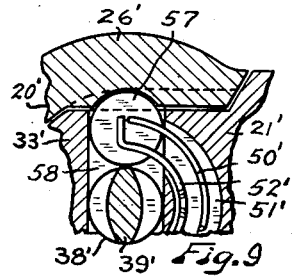
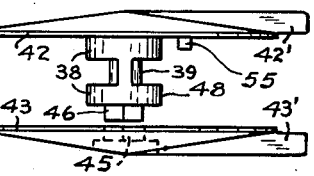
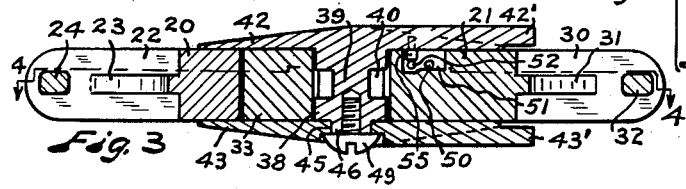
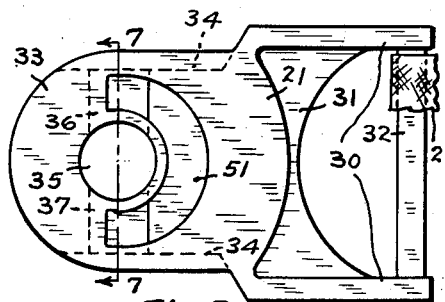
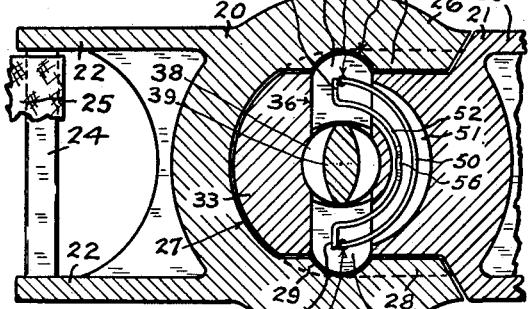
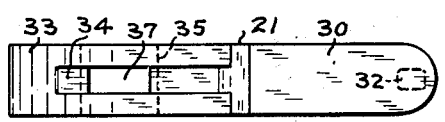
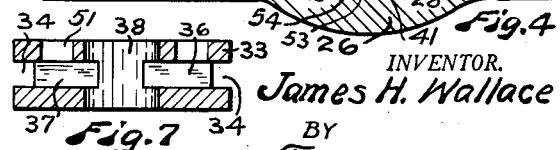
INVENTOR.
James H. Wallace
BY
Fred C. Matheny
ATTORNEY

United States Patent Office 2,802,251
Patented Aug. 13, 1957

2,802,251

MANUALLY RELEASABLE FASTENING DEVICE FOR SAFETY BELTS AND THE LIKE

James H. Wallace, Puyallup, Wash.

Application June 16, 1953, Serial No. 361,973

3 Claims. (Cl. 24—230)

This invention relates to a manually releasable fastening device which may be used as a clasp for safety belts and may also be used for other purposes.

An object of this invention is to provide a simple, efficient and reliable fastening device which will not release accidentally under strain or load but which can be quickly and easily released manually irrespective of the amount of strain or load sustained at the time of release.

Another object is to provide a fastening device of this nature which is well adapted for use as a clasp on safety belts of the type used by persons in airplanes, racing cars, racing or speed boats and the like and which is designed to minimize hazards in case of accident because it requires no special knowledge or training on the part of the user to release it and because it will release when a lever thereon is moved in either direction from a locked position.

Another object is to provide a manually releasable holding device which is well adapted for use as a connecting means between a parachutist and his parachute since this device makes it possible for a parachutist to instantly disconnect himself from his parachute if he lands in the water or in a tree or is in danger of being dragged by the parachute.

Another object is to provide a readily releasable holding device which is simple in construction and not expensive to make and which is capable of being made of various different materials and in various different ways, as by forging, machining, die casting and the like.

Other objects of the invention will be apparent from the following description taken in connection with the accompanying drawings.

In the drawings Figure 1 is an exploded plan view of manually releasable fastening devices constructed in accordance with this invention, showing the two parts thereof as they may appear when they are disconnected from each other and separated a short distance apart.

Fig. 2 is a plan view of said devices as they may appear when they are fastened or locked together.

Fig. 3 is a sectional view taken substantially on broken line 3—3 of Fig. 2.

Fig. 4 is a sectional view taken substantially on broken line 4—4 of Fig. 3, parts being broken away.

Fig. 5 is a detached plan view of one frame part of the device.

Fig. 6 is an edge view of the frame part shown in Fig. 5.

Fig. 7 is a view in cross section taken substantially on broken line 7—7 of Fig. 5.

Fig. 8 is a detached exploded edge view of two rotatable disc parts embodied in the invention.

Fig. 9 is a fragmentary view partly in section and partly in plan showing locking means of modified form.

Like reference numerals designate like parts throughout the several views.

This fastening device comprises two frame members 20 and 21 that are adapted to be secured to the end portions of two members which are to be attached together, such as to two end portions of a safety belt 25. The end portion of the frame member 20 which is shown at the left in the drawings is provided with two spaced apart integral side bars 22. The side bars 22 are reinforced by a web member 23 and are provided with a rigidly attached cross bar 24 to which an end portion of the belt 25 or like article may be connected. A fragment only of the belt 25 is shown.

The end portion of the frame member 20 shown at the right in the drawings is forked or of U shape and has two spaced apart opposed side members 26 between which is a tongue receiving recess 27. The inner surface of each side member 26 is provided with a longitudinally extending tongue 28. A bolt receiving notch 29 is provided in each tongue 28, the two bolt receiving notches 29 being in opposed relation. Preferably the bolt receiving notches 29 are arcuate or concavely curved notches, as shown.

The end portion of the frame member 21 which is shown at the right in the drawings has two integral spaced apart side bars 30 which are reinforced by a web 31 and are provided at their outer ends with a rigidly connected cross bar 32. An end portion of the belt 25, or any other suitable member, may be connected with the cross bar 32. The other end portion of the frame member 21 is in the form of an integral tongue 33 of suitable width to fit telescopically between the side members 26 of the forked frame member 20. Grooves 34 are provided in and extend longitudinally of the outer faces or edges of the tongue 33, Figs. 6 and 7. The grooves 34 fit over and receive the tongues 28 on the side members 26 of frame part 20 when the two frame parts are in telescoped or latched together relation.

The medial portion of the tongue 33 has a cylindrical hole 35 extending through it. Also this tongue 33 is provided with two transverse bolt receiving passageways 36 and 37 which extend radially outward from the cylindrical hole 35 to the side grooves 34, see Figs. 5, 6 and 7. A cylindrical bolt operating member 38 is rotatively disposed in the hole 35 and a cam 39 is formed between the two ends of the cylindrical member 38. Two bolts 40 and 41 are movably disposed within the respective bolt receiving passageways 36 and 37 and the inner ends of these bolts engage with the cam 39. The outer ends of the bolts 40 and 41 are of convexly rounded shape and are adapted to extend into and lock within the bolt receiving notches 29 of the frame member 20 when the two frame members are locked together. The end surfaces 19 of the two side members 26 and tongues 28 of the frame part 20 are convergently beveled so that when the rounded outer ends of the bolts 40 and 41 are pressed against these beveled surfaces 19 in telescoping the two parts 20 and 21 together these beveled surfaces 19 will cooperate in pressing the bolts 40 and 41 inwardly.

The cylindrical bolt operating member 38 has two discs 42 and 43 rigidly secured thereto. In the structure shown in the drawings the disc 42 is integral with the cylindrical member 38 and said disc 42 has an operating handle or thumb piece 42' rigid therewith. The other disc 43 has an operating handle 43' and said other disc 43 is detachable and has a centrally positioned hole 45 which is adapted to fit over a small hub or shank 46 on the end of the cylindrical member 38. The shank 46 and hole 45 are preferably of non-circular shape, for instance square, to prevent relative rotation of parts 43 and 38. A screw 49, Fig. 3, may be used to secure the disc 43 to the cylindrical member 38.

A bolt engaging spring 50, which may be a piece of spring wire, is disposed within a recess 51 in the tongue member 33. The bottom of the recess 51 is substantially flush with one side or face of the bolts 40 and 41, see Fig. 3, and the recess 51 extends partially across these bolts and intersects the bolt receiving passageways 36 and 37, as will be apparent from Fig. 5. The end portions of the spring 50 extend over and may rest on the bolts 40 and 41 and are bent at right angles in a downward direction as respects the showing in Fig. 4 and the downwardly bent end portions of said spring engage within recesses in the bolts 40 and 41. The spring 50 yieldingly urges the bolts 40 and 41 outwardly into a locked position and when the cam 39 is in an unlocked position, as shown by broken lines in Fig. 1, the bolts are easily moved inwardly by reaction of parts of the frame member 20 against the ends of these bolts to permit engagement or disengagement of the two frame members 20 and 21 relative to each other. The end portions of the spring 50 adjacent the parts which are embedded in the bolts 40 and 41 are adapted to engage with the end walls of the recess 51 and serve as stop means to limit the outward movement of the bolts 40 and 41 and to prevent said bolts from moving too far out of the bolt receiving recesses 36 and 37.

A pin 55 in the disc 42 is positioned for engagement with a detent spring 52 and moves in an arc longitudinally of said detent spring 52 when the discs 42 and 43 are moved rotatively. A pin receiving depression 56 is provided in the medial portion of the detent spring 52 to receive the pin 55 and yieldingly hold the discs 42 and 43 and parts 38 and 39 against accidental movement. The pin 55 will be in the notch 56 whenever the handles 42' and 43' are positioned lengthwise of the frame part 21 and the bolt members 40 and 41 are being held outwardly in locked position by the cam 39. The pin 55 also serves as a stop member to engage with the walls at the ends of the recess 51 when the handles 42' and 43' are crosswise of the frame member 21. This limits angular movement of the discs 42 and 43 and cam 39 to about one hundred eighty degrees.

The two spring members 50 and 52 operate in the same recess 51 and do not interfere with each other and springs of one size can be used in fastening devices of different sizes. If desired the pin 55 may be secured to the removable disc 43 and the positions of the two discs 42 and 43 may be reversed from that shown in the drawings. Also, if desired, one of the handles 42' or 43' may be omitted or two diametrically opposite handles may be provided on either of the discs 42 or 43 or on both of said discs.

The structure as shown and hereinbefore described allows about one hundred eighty degrees of turning movement of the parts 38, 39, 42 and 43, with the locking bolts 40 and 41 always free to be retracted against the outward pressure of the spring 50, when the handles 42' and 43' are positioned crosswise of the frame part 21 and always blocked in an outwardly projected or locking position by the cam 39 when said handles are positioned lengthwise of said frame part 21. It is desirable to provide lock operating means in which the thumb piece is generally parallel to the body or frame 21, 20 when the parts are locked and in which the thumb piece is rotatively movable in either direction to a position approximately crosswise of the frame 20, 21 into a bolt releasing unlocked position. This mode of operation reduces the amount of mental decision required on the part of a user when under stress to release the lock.

Fig. 9 shows a modified form of this invention in which bolt members 57 of disc shape are used in place of the previously described oblong bolt members 40 and 41. The disc shaped bolt members 57 are disposed in passageways 58 which correspond to the previously described passageways 36 and 37 except that they are of a width equal to the diameter of the discs. The parts 20', 21', 26', 33', 38', 39', 50', 51', 52', shown in Fig. 9 correspond to the previously described parts 20, 21, 26, 33, 38, 39, 50, 51 and 52 and function in a similar manner.

In the operation of this readily releasable fastening device it will be understood that any two members which are to be connected together in such a manner that they can be readily and instantly disconnected are attached to the respective frame parts 20 and 21. These frame parts 20 and 21 are locked in engagement with each other by relatively telescoping said two frame parts together while the handle members 42' and 43' are positioned crosswise of the frame part 21, then turning said handle members lengthwise of the telescoped frame members 20 and 21 to move the cam 39 into locking or blocking engagement with the outwardly projecting bolts 40 and 41. When the cam 39 is in the position shown in Figs. 2 and 4 the bolts 40 and 41 can not be released by stresses in the nature of a pull within the limits the device is designed to withstand. However, said device is always quickly and easily releasable by the user by turning the cam 39 into the position in which it is shown in Fig. 1 and this cam can always be easily turned irrespective of the amount of load under which the device is operating.

The foregoing description and accompanying drawings clearly disclose a preferred embodiment of this invention but it will be understood that this disclosure is merely illustrative and that changes may be made within the scope and spirit of the following claims.

I claim:

1. A readily releasable fastening device comprising a forked frame member having a U-shaped tongue receiving recess open at one end; opposed concave bolt receiving notches in the sides of the part of said forked frame member forming said tongue receiving recess; another frame member having a tongue part adapted to fit telescopically within said tongue receiving recess; interfitting tongue and groove means in the edges of said tongue part and adjacent faces of said forked frame member holding said two frame members in alignment and in a common plane; two bolt members carried by said tongue part and having rounded outer ends positioned to enter said concave bolt receiving notches when said two frame members are in relatively telescoped relation; spring means yieldingly urging said bolt members into outwardly projected locked positions; a cam rotatively supported by said tongue part and movable into and out of blocking position relative to said bolt members, whereby said bolt members are held in locked position; two discs rigid with said cam and positioned on opposite sides of said tongue part; an operating handle on at least one of said discs; and detent spring means carried by said tongue part and engaged by said discs yieldingly holding said discs against movement when the cam is in locking position relative to said bolt members.

2. The apparatus as claimed in claim 1 in which a cam receiving recess and bolt receiving passageways and a spring receiving recess are provided in said tongue part and in which said discs cover the spring receiving recess.

3. A readily releasable fastening device comprising a forked frame member having a U-shaped tongue receiving recess open at one end; opposed belt receiving notches in the forked part of said frame member at the sides of said U-shaped recess; another frame member having a tongue part adapted to fit telescopically within said U-shaped recess, said tongue part having bolt receiving passageways extending crosswise thereof and having a cam receiving passageway extending from one face to the other between said bolt receiving passageways; interfitting longitudinally extending tongue and groove means provided on the edges of said tongue part and on the adjacent surfaces of the sides of the forked part of said forked frame member holding said two frame members in alignment and in a common plane when the two frame members are relatively telescoped; two bolt members slidably disposed in the bolt receiving passageways of said tongue part and movable toward and away from each other out of and into said bolt receiving notches in said forked frame member when the two frame members are in telescoped relation to each other; a readily releasable cam rotatively disposed in the cam receiving passageway in said tongue part and having a non-circular bolt blocking portion movable into a bolt obstructing position locking said bolt members in said notches; and two discs rigidly connected with said cam and positioned closely adjacent the respective opposite sides of said tongue part.

References Cited in the file of this patent

FOREIGN PATENTS

| | | |
|---|---|---|
| 638,355 | France | Feb. 20, 1928 |
| 695,223 | France | Sept. 29, 1930 |